United States Patent
Yamato

(10) Patent No.: US 11,939,058 B2
(45) Date of Patent: Mar. 26, 2024

(54) UNMANNED AERIAL VEHICLE

(71) Applicant: Rakuten Group, Inc., Tokyo (JP)

(72) Inventor: Takumi Yamato, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 497 days.

(21) Appl. No.: 17/270,945

(22) PCT Filed: Jul. 23, 2019

(86) PCT No.: PCT/JP2019/033175
§ 371 (c)(1),
(2) Date: Feb. 24, 2021

(87) PCT Pub. No.: WO2021/038666
PCT Pub. Date: Mar. 4, 2021

(65) Prior Publication Data
US 2022/0332414 A1    Oct. 20, 2022

(51) Int. Cl.
*B64C 39/02* (2023.01)
*B64D 45/00* (2006.01)
*A01M 29/16* (2011.01)
*B64U 101/00* (2023.01)

(52) U.S. Cl.
CPC ............ *B64C 39/024* (2013.01); *B64D 45/00* (2013.01); *A01M 29/16* (2013.01); *B64D 2221/00* (2013.01); *B64U 2101/00* (2023.01)

(58) Field of Classification Search
CPC .. B64C 39/024; B64D 45/00; B64D 2221/00; B64U 2101/00; A01M 29/16
See application file for complete search history.

(56) References Cited

U.S. PATENT DOCUMENTS

| | | | |
|---|---|---|---|
| 9,807,996 B1 * | 11/2017 | Yu | A01M 1/06 |
| 2016/0083073 A1 * | 3/2016 | Beckman | G09F 9/33 |
| | | | 244/1 N |
| 2018/0077918 A1 * | 3/2018 | Yu | B64C 39/024 |
| 2019/0045980 A1 * | 2/2019 | Yu | F16K 31/02 |
| 2019/0100311 A1 * | 4/2019 | Yu | A01M 29/16 |

FOREIGN PATENT DOCUMENTS

| | | |
|---|---|---|
| CN | 108557080 A | 9/2018 |
| JP | 2017-534900 A | 11/2017 |
| JP | 2019-47755 A | 3/2019 |

(Continued)

OTHER PUBLICATIONS

Notice of Reasons for Rejection issued to JP Application No. 2020-520178, dated Jun. 16, 2020.

(Continued)

*Primary Examiner* — Justin M Benedik
(74) *Attorney, Agent, or Firm* — Sughrue Mion, PLLC

(57) ABSTRACT

An unmanned aerial vehicle according to the present invention includes: a main body; an arm that extends from the main body to support a rotor; a first electrical conductor which is supported by the arm and to which a voltage is applied; a second electrical conductor which is supported by the arm and spaced apart from the first electrical conductor and to which a voltage lower than the voltage applied to the first electrical conductor is applied; and a controller configured to control electrical supply to the first and second electrical conductors.

19 Claims, 5 Drawing Sheets

(56) References Cited

FOREIGN PATENT DOCUMENTS

| | | |
|---|---|---|
| JP | 2019-517243 A | 6/2019 |
| KR | 10-1997148 B1 | 7/2019 |
| WO | 2016/048897 A1 | 3/2016 |
| WO | 2017/208354 A1 | 12/2017 |
| WO | 2017/209974 A1 | 12/2017 |
| WO | 2018/182944 A1 | 10/2018 |
| WO | 2018/224890 A2 | 12/2018 |
| WO | 2018/225646 A1 | 12/2018 |

OTHER PUBLICATIONS

Notice of Reasons for Rejection issued to JP Application No. 2020-520178, dated Nov. 10, 2020.
Notice of Decision to Grant a Patent issued to JP Application No. 2020-520178, dated Dec. 22, 2020.

* cited by examiner

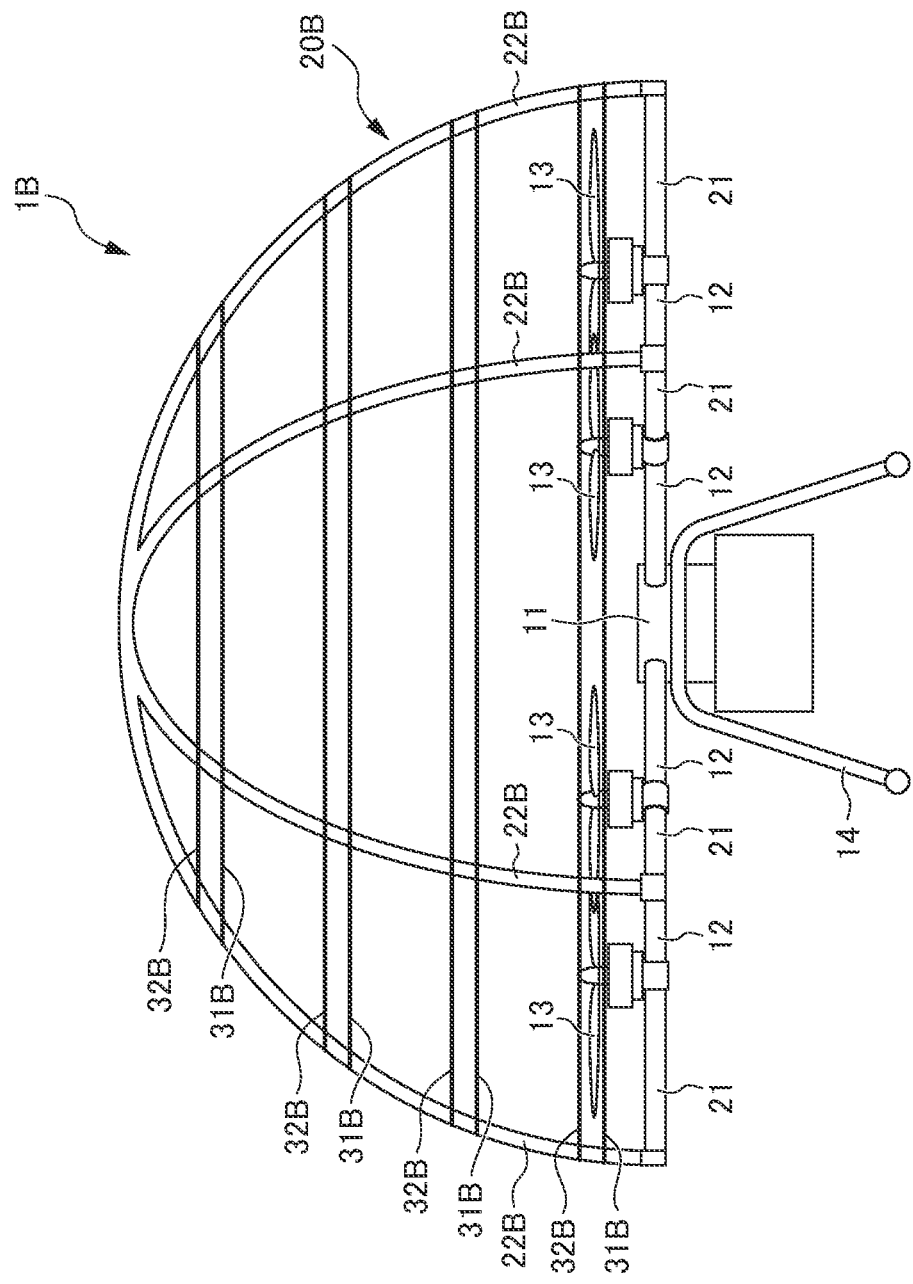

UNMANNED AERIAL VEHICLE

CROSS REFERENCE TO RELATED APPLICATIONS

This application is a National Stage of International Application No. PCT/JP2019/033175 filed Aug. 23, 2019.

TECHNICAL FIELD

The present invention relates to an unmanned aerial vehicle.

BACKGROUND ART

In a conventionally known technique, unmanned aerial vehicles are used to scare and drive away birds and animals. For example, Patent Document 1 discloses such a technique. Patent Document 1 discloses that a rotating rotor(s) may produce a series of sounds at audio frequencies corresponding to pitches intended to scare away animals.
Patent Document 1: Japanese Unexamined Patent Application (Translation of PCT Application), Publication No. 2017-534900

DISCLOSURE OF THE INVENTION

Problems to be Solved by the Invention

Since the frequency of an effective repelling sound differs depending on the type of bird or animal to be monitored, in some cases, poor choice of frequency of the sound may result in a repelling effect that is less than expected depending on the target to be repelled. In addition, if the monitored target gets used to a certain frequency, sound at the same frequency will no longer have the same expelling effect, which makes it difficult to sustain the effect of expelling the monitored target.

An object of the present invention, which has been made under these circumstances, is to provide an unmanned aerial vehicle capable of reliably driving away a monitored target.

Means for Solving the Problems

An aspect of the present invention is directed to an unmanned aerial vehicle including: a main body; a support that extends from the main body to support a rotor; a first electrical conductor which is supported by the support and to which a voltage is applied; a second electrical conductor which is supported by the support and spaced apart from the first electrical conductor and to which a voltage lower than the voltage applied to the first electrical conductor is applied; and a controller configured to control electrical supply to the first and second electrical conductors.

Effects of the Invention

The present invention makes it possible to provide an unmanned aerial vehicle capable of reliably driving away a monitored target.

BRIEF DESCRIPTION OF THE DRAWINGS

FIG. 5 is a front view showing an unmanned aerial vehicle according to a third embodiment of the present invention.

PREFERRED MODE FOR CARRYING OUT THE INVENTION

Hereinafter, non-limiting exemplary embodiments of the present invention will be described with reference to the drawings.

The unmanned aerial vehicle according to the present invention is a vehicle that is capable of flying in an unmanned manner, known as a drone. The term "capable of flying in an unmanned manner" means the ability to fly with no human pilot on board and is intended to cover not only autonomous flying vehicles but also human remote-controlled unmanned flying vehicles.

Figure 1:
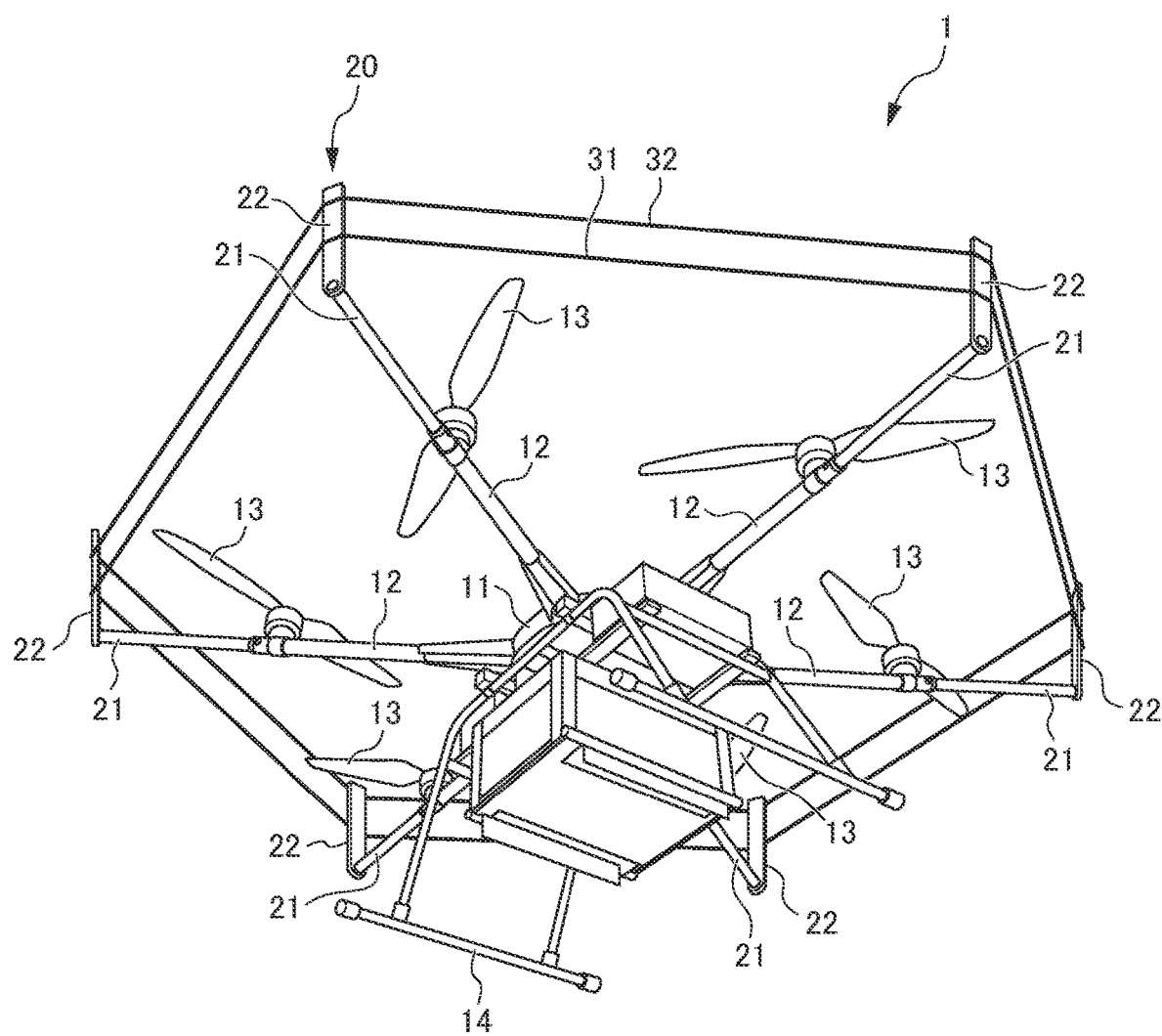
FIG. 1 is a perspective view showing an unmanned aerial vehicle according to a first embodiment of the present invention as viewed obliquely from below.

An unmanned aerial vehicle 1 according to a first embodiment of the present invention will be described. FIG. 1 is a perspective view of the unmanned aerial vehicle 1 as viewed obliquely from below.

As shown in FIG. 1, the unmanned aerial vehicle 1 includes a main body 11, arms 12 as supports extending from the main body 11, rotors 13 supported by the arms 12, and a propeller guard 20.

The main body 11 is located at a center of the unmanned aerial vehicle 1 in plan view and equipped with a controller 100 and electronic devices such as sensors including a camera 50 (e.g., a computer including a CPU, a memory, and other components and configured to execute a control program). A leg 14 for landing on a landing surface is disposed at a lower part of the main body 11.

Each arm 12 has one end connected to the main body 11 and the other end (hereinafter referred to as the "distal end") serving as a support on which the rotor 13 is disposed. In this embodiment, six (plural) arms 12 extend radially (in radial directions) from the main body 11 in plan view. The six arms 12 are spaced at equal intervals along the circumferential direction in plan view.

Figure 2:
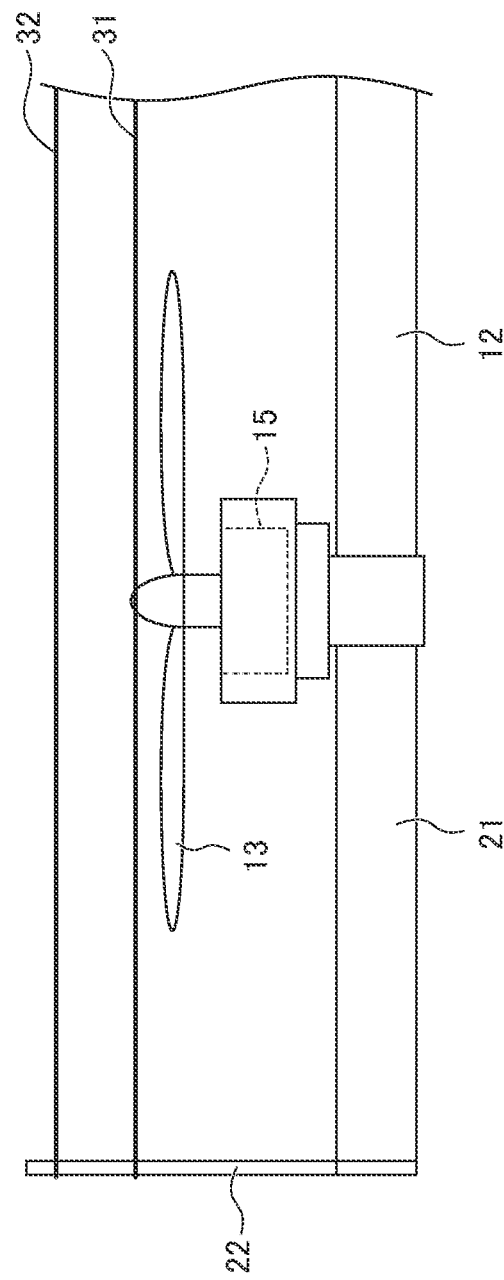
FIG. 2 is an enlarged view of an area at and around a rotor of the unmanned aerial vehicle according to the first embodiment of the present invention.

FIG. 2 is an enlarged view of an area at and around the rotor 13 of the unmanned aerial vehicle 1. The rotor 13 is supported on the main body 11 through the arm 12. Specifically, as shown in FIG. 2, the rotor 13 is rotatably disposed on an upper surface of the distal end of the arm 12. A rotor motor 15 connected to the rotor 13 is built in the distal end of the arm 12. As the rotor motor 15 rotates, the rotor 13 is rotated to produce a lift force that enables the unmanned aerial vehicle 1 to fly.

The propeller guard 20 includes fixed portions 21 each disposed at the distal end of each arm 12; an annular first electrical conductor 31 supported by each fixed portion 21; and an annular second electrical conductor 32 supported by each fixed portion 21.

The fixed portions 21 are each a shaft member extending in a direction where the arm 12 extends. In plan view, the fixed portion 21 horizontally extends outward from the arm 12 to support the first and second electrical conductors 31 and 32 outside the rotor 13. In this context, the term "outside" indicates a side away from the main body 11 in plan view with respect to the center of gravity or the center of the main body 11 in the unmanned aerial vehicle 1, which may be alternatively expressed as "radially outside" with respect to the center of a sphere.

An extension 22 extending substantially parallel to the axis of rotation of the rotor 13 is disposed at the distal end of each fixed portion 21. The extensions 22 support the first and second electrical conductors 31 and 32. As shown in FIG. 2, the extensions 22 are disposed at positions where they are not in contact with the rotating rotors 13.

The first and second electrical conductors 31 and 32 have the function of electrically shocking the target when in contact with it. In this embodiment, the first and second electrical conductors 31 and 32 are each an electrically conductive wire to which a voltage is applied in response to an actuating signal from an electrical supply control section 110 in the controller 100, which will be both described later. The voltage applied to the second electrical conductor 32 is lower than the voltage applied to the first electrical conductor 31. Under the application of voltage, the first and first electrical conductors 31 and 31 are at high and low potentials, respectively. The electrical supply to the first and second electrical conductors 31 and 32 helps to scare and drive away birds and animals.

As shown in FIG. 1, the first electrical conductor 31 is provided in an annular shape to surround an area outside the main body 11 and the six rotors 13 in plan view. The first electrical conductor 31 is stretched over the six extensions 22 and fixed on the outer surface of each extension 22 (the surface opposite to the main body 11). Thus, the first electrical conductor 31 is supported on the arms 12 through the fixed portions 21 and the extensions 22. The first electrical conductor 31 extends in a direction orthogonal to the extensions 22. The first electrical conductor 31 is located outside the rotors 13 and disposed at a position where it is not in contact with the rotating rotors 13.

As shown in FIG. 1, the second electrical conductor 32 is provided in an annular shape to surround an area outside the main body 11 and the six rotors 13 in plan view. The second electrical conductor 32 is stretched over the six extensions 22 and fixed on the outer surface of each extension 22. Thus, the second electrical conductor 32 is supported on the arms 12 through the fixed portions 21 and the extensions 22. The second electrical conductor 32 is located outside the rotors 13 and disposed at a position where it is not in contact with the rotating rotors 13. The second electrical conductor 32 is disposed above the first electrical conductor 31.

The first and second electrical conductors 31 and 32 are spaced apart from each other. The distance between the first and second electrical conductors 31 and 32 is set to a distance that is narrow enough to allow both the first and second electrical conductors 31 and 32 to come into contact with a monitored target such as a bird or animal. In this embodiment, the first and second electrical conductors 31 and 32 are in parallel to each other. The first and second electrical conductors 31 and 32 provided in an annular shape to externally surround all the rotors 13 also function to protect the main body 11 and the rotors 13 from other flying vehicles, birds and animals, and structures such as buildings.

Figure 3:
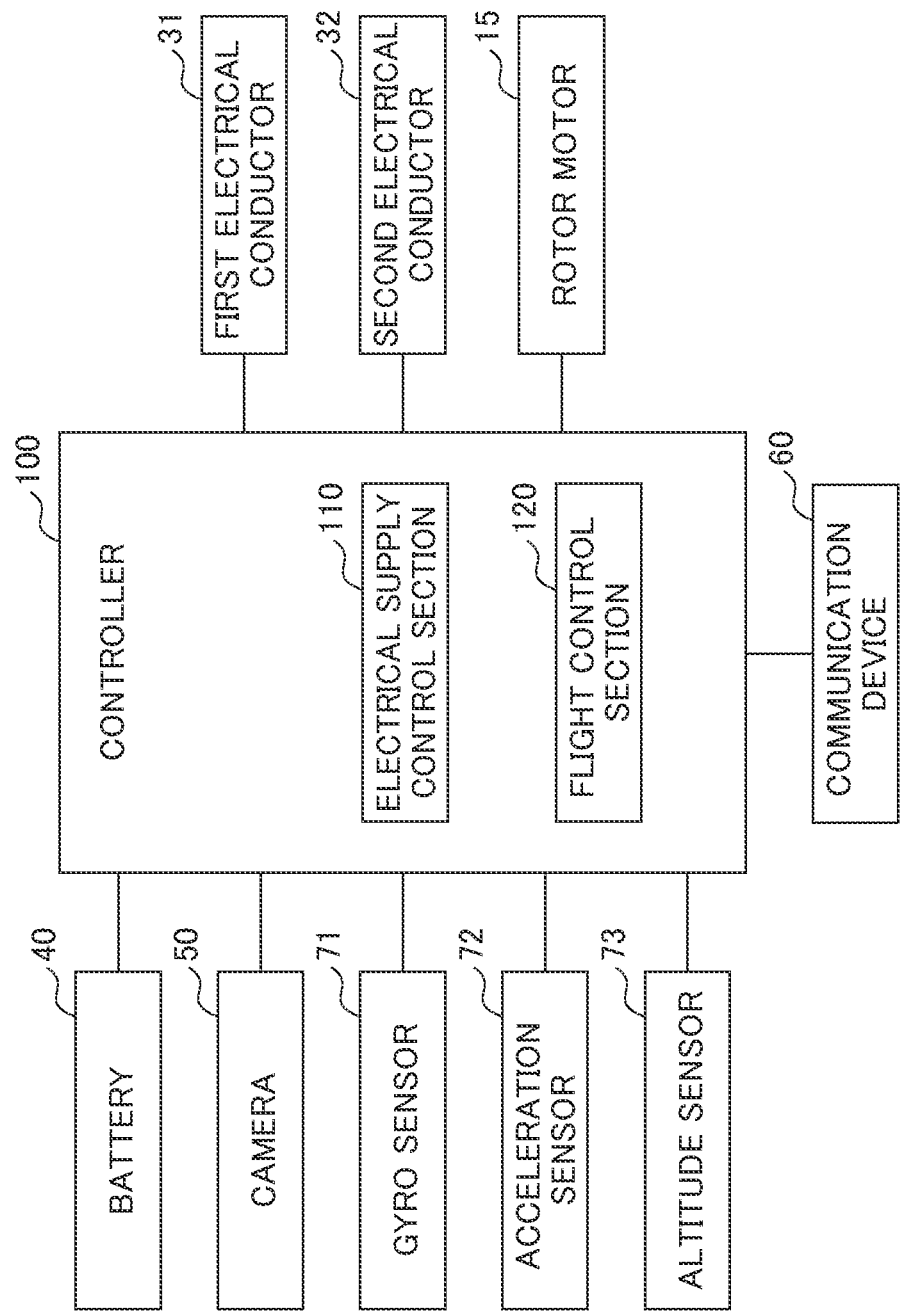
FIG. 3 is a block diagram showing an electrical configuration of a controller of the unmanned aerial vehicle according to the first embodiment of the present invention.

Next, the controller 100 will be described. FIG. 3 is a block diagram showing an electrical configuration of the controller 100 in the unmanned aerial vehicle 1.

The controller 100 is a computer configured to execute various control processes necessary for the flight and other operations of the unmanned aerial vehicle 1. The controller 100 is electrically connected to: a power supply device such as a battery 40; a detector such as a camera 50; a communication device (communication section) 60 that transmits and receives signals to and from an external device such as an operation controller or GPS; and various sensors such as a gyro sensor 71, an acceleration sensor 72, and an altitude sensor 73.

As shown in FIG. 3, the controller 100 includes an electrical supply control section 110 configured to control electrical supply to the first and second electrical conductors 31 and 32; and a flight control section 120 configured to control the flight of the unmanned aerial vehicle 1. The electrical supply control section 110 and the flight control section 120 are implemented by some of the programs stored in the controller 100.

To control electrical supply to the first and second electrical conductors 31 and 32, the electrical supply control section 110 controls turning on and off of a power supply circuit (not shown) between the battery 40 and the first and second electrical conductors 31 and 32 based on various types of information from the camera 50, the communication device 60, the altitude sensor 73, and so on. Electric discharge sounds may also be produced by generating an electric discharge between the first and second electrical conductors 31 and 32 to scare and drive away birds and animals around the unmanned aerial vehicle 1. The battery 40 may be located at any position. The battery 40 may be provided in the main body 11 to supply power to the first and second electrical conductors 31 and 32 through cables. Alternatively, the battery 40 may be disposed in the fixed portion 21 or the extension 22.

The flight control section 120 controls the flight of the unmanned aerial vehicle 1 based on various types of information from the camera 50, the communication device 60, the gyro sensor 71, the acceleration sensor 72, the altitude sensor 73, and so on. The flight control section 120 controls the driving of the rotor motor 15 to control, for example, the rotational speed of the rotor 13.

Next, an example of how to control the flight and the voltage on the first and second electrical conductors 31 and 32 by means of the electrical supply control section 110 and the flight control section 120 in the controller 100 will be described.

When the camera 50 in the unmanned aerial vehicle 1 detects a predetermined target to be monitored, the controller 100 shifts to a chase control mode for chasing the target while it is ready to supply a voltage to the first and second electrical conductors 31 and 32. Examples of the target to be monitored include birds and animals, such as birds responsible for bird strikes at airports and mammals including wild boars causing damage to crops in agricultural fields.

The controller 100 makes a comparison between the image captured by the camera 50 and information that is stored in the controller 100 to identify the target to be monitored and then determines whether the target to be monitored is detected in the image captured by the camera 50. When the camera 50 detects the target to be monitored, the flight control section 120 shifts to a chase control mode for chasing the target.

In the chase control mode, the flight of the unmanned aerial vehicle 1 is controlled so that both the first and second electrical conductors 31 and 32 come into contact with the target. In the chase control mode, a current may be allowed to constantly flow through the first and second electrical conductors 31 and 32, or a current may be allowed to flow through the first and second electrical conductors 31 and 32 only when the unmanned aerial vehicle 1 approaches the target so that the distance between them is shorter than a predetermined value. The chase control mode is terminated, for example, when it is confirmed that the target has escaped. In the chase control mode, the first and second electrical conductors 31 and 32 do not always need to come into contact with the target. The chase control may be such that, for example, electric discharge sounds are produced to scare the target so that the target can be driven away from a certain area. As described above, the chase control mode is non-limiting and may be appropriately changed according to circumstances.

When the camera 50 detects a person, the electrical supply control section 110 switches to a no current flow control mode in which no current is allowed to flow through the first and second electrical conductors 31 and 32. In this state, there is no shift to the chase control mode. Upon the detection of a person, even the chase control mode for the first and second electrical conductors 31 and 32 is changed to the no current flow control mode, so that a contact accident between the person and the first and second electrical conductors 31 and 32 is reliably prevented. When a person is detected during the chase control mode, the flight control section 120 may perform control to continue the chase of the target in the no current flow control mode or to end the chase control mode.

The controller 100 may also control the flight of the unmanned aerial vehicle 1 and the electrical supply to the first and second electrical conductors 31 and 32 based on not only the information from the camera 50 but also information for starting the electrical supply, which is received by the communication device 60.

For example, the controller 100 may control the flight of the unmanned aerial vehicle 1 based on information from a ground system configured to detect targets entering a predetermined area in a farm, an airport, or the like. More specifically, when receiving a signal indicating the detection of a target from the ground system through the communication device 60, the unmanned aerial vehicle 1 may be controlled to circulate in a target area monitored by the ground system. For example, when the unmanned aerial vehicle 1 is in the target area monitored by the ground system and receives, from the ground system, information for starting the electrical supply, the electrical supply control section 110 may perform control to switch the first and second electrical conductors 31 and 32 to the chase control mode. As a result, the unmanned aerial vehicle 1 circulates only when the ground system detects the target, so that the power consumed by the unmanned aerial vehicle 1 for monitoring and driving away birds and animals can be saved. In addition, the unmanned aerial vehicle 1 can monitor the target in cooperation with the ground system, so that it can more reliably drive away the target entering the predetermined area.

Alternatively, the electrical supply control section 110 of the controller 100 may perform control for switching to the chase control mode to allow a current to flow through the first and second electrical conductors 31 and 32 based on information for starting the electrical supply, which is input to an external operation controller.

Alternatively, the electrical supply control section 110 may perform control to allow a current to flow through the first and second electrical conductors 31 and 32 based on data about the flight altitude of the unmanned aerial vehicle 1 acquired through the communication device 60, the altitude sensor 73, or the like, which receives position information from GPS or the like. Specifically, when the flight altitude is lower than a predetermined altitude, the electrical supply control section 110 may open the power circuit to stop the application of voltage to the first and second electrical conductors 31 and 32. As a result, a contact accident between a person and the first and second electrical conductors 31 and 32 under application of voltage is reliably prevented even in a situation where the unmanned aerial vehicle 1 flying close to the ground is likely to come into contact with the person.

Figure 4:
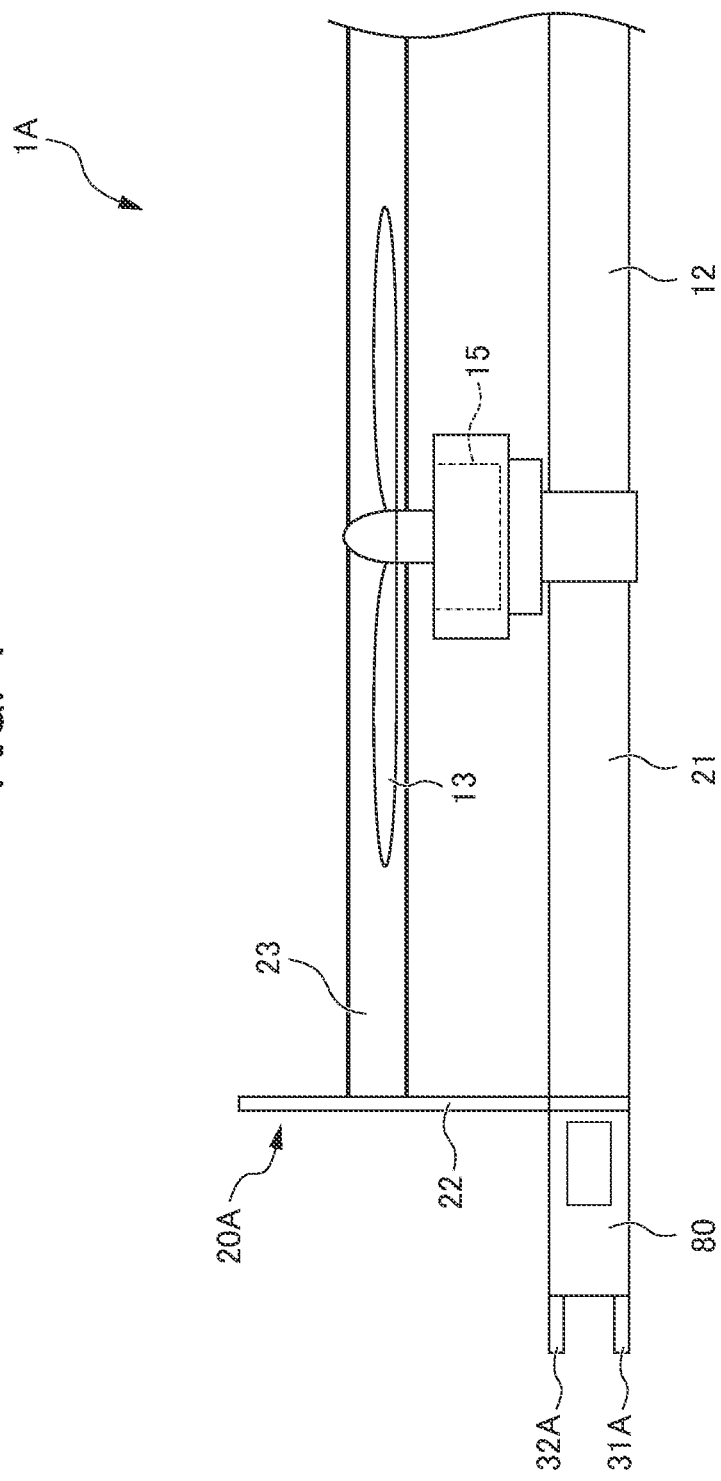
FIG. 4 is an enlarged view of an area at and around a rotor of an unmanned aerial vehicle according to a second embodiment of the present invention.

Next, an unmanned aerial vehicle 1A according to a second embodiment of the present invention will be described with reference to FIG. 4. FIG. 4 is an enlarged view of an area at and around a rotor 13 in the unmanned aerial vehicle 1A. Some components that are the same as those in the unmanned aerial vehicle 1 according to the first embodiment are denoted by the same reference numerals as those in the first embodiment, and a repeated description thereof may be omitted.

The unmanned aerial vehicle 1A has a propeller guard 20A with a structure different from that in the unmanned aerial vehicle 1 of the first embodiment. In the second embodiment, the propeller guard 20A includes fixed portions 21, plural extensions 22, guard portions 23, electrode holders 80, first electrical conductors 31A, and second electrical conductors 32A. In this embodiment, six arms 12 are provided, and the fixed portion 21, the extension 22, the electrode holder 80, and the first and second electrical conductors 31A and 32A are attached to each of the six arms 12.

The guard portions 23 are stretched over so that the six extensions 22 are connected. Specifically, in plan view, six (plural) guard portions 23 define a hexagonal (polygonal) area. All the rotors 13 are located in the hexagonal area. As shown in FIG. 4, each guard portion 23 is preferably located at a level substantially the same as that of the rotor 13 in the vertical direction to protect the rotor 13 from other flying vehicles, buildings, and so on. Each guard portion 23 is made of a flexible material. The guard portion 23 itself may be electrically conductive or non-electrically-conductive.

The electrode holder 80 has one end connected to the extension 22 and the other end (hereinafter referred to as the "distal end") provided with the first and second electrical conductors 31A and 32A. The electrode holder 80 is attached to a lower portion of the outer surface of the extension 22 and extends in a direction orthogonal to the extension 22.

The electrode holder 80 is disposed on each of the extensions 22. The electrode holder 80 holds the first and second electrical conductor 31A and 32B.

The first and second electrical conductors 31A and 32B are attached to the distal end of the electrode holder 80 and form electrodes to which a voltage is applied from an electrical supply control section 110 of a controller 100. The voltage applied to the second electrical conductor 32A is lower than the voltage applied to the first electrical conductor 31A. In this embodiment, the first and second electrical conductors 31A and 32A are attached to each of the six electrode holders 80.

As shown in FIG. 4, the first and second electrical conductors 31A and 32A horizontally protrude outward from the electrode holder 80. In other words, the first and second electrical conductors 31A and 32A protrude in a direction away from the main body 11. The first and second electrical conductors 31A and 32A are spaced apart from each other. The distance between the first and second electrical conductors 31A and 32A may be any distance that is narrow enough to allow the first and second electrical conductors 31A and 32A to simultaneously come into contact with a monitored target such as a bird or animal. The first electrical conductor 31A is located below the second electrical conductor 32A.

Next, an unmanned aerial vehicle 1B according to a third embodiment of the present invention will be described with reference to FIG. 5. FIG. 5 is a front view showing the unmanned aerial vehicle 1B.

Like the unmanned aerial vehicle 1 according to the first embodiment, the unmanned aerial vehicle 1B includes a main body 11, plural arms 12, and plural rotors 13.

However, the unmanned aerial vehicle 1B has a propeller guard 20B with a structure different from that in the unmanned aerial vehicle 1 of the first embodiment.

The propeller guard 20B includes fixed portions 21 attached to the distal ends of six arms 12; extensions 22B each attached to the distal end of the fixed portion 21 and extending obliquely upward to substantially directly above the main body 11; and first and second electrical conductors 31B and 32B attached to the extensions 22B. As shown in FIG. 5, the propeller guard 20B is dome-shaped as a whole.

Each extension 22B extends obliquely upward from the distal end of each of the six fixed portions 21B, and the six extensions 22B are connected together substantially directly above the main body 11. Specifically, as shown in FIG. 5, the extensions 22 are arch-shaped in front view, and radially arranged around a center substantially directly above the main body 11 in plan view. The extensions 22B are disposed at positions where they are not in contact with the rotating rotors 13.

The first and second electrical conductors 31B and 32B are each an electrically conductive wire to which a voltage is applied from an electrical supply control section 110 in a controller 100. The voltage applied to the second electrical conductor 32B is lower than the voltage applied to the first electrical conductor 31B. Under the application of voltage, the first and second electrical conductors 31B and 32B are at high and low potentials, respectively. In the second embodiment, four pairs (plural pairs) of the first and second electrical conductors 31A and 32B are provided on the extensions 22B.

As shown in FIG. 5, the first and second electrical conductors 31B and 32 are stretched over the six extensions 22B and each provided in an annular shape around the main body 11 as a center in plan view. The first and second electrical conductors 31B and 32B are fixed on an outer surface of each extension 22B. The first and second electrical conductors 31B and 32B in each pair are spaced apart from each other and arranged to extend substantially in parallel to each other. The distance between the first and second electrical conductors 31B and 32B in each pair may be any distance that is narrow enough to allow the first and second electrical conductors 31B and 32B to simultaneously come into contact with a monitored target such as a bird or animal.

As shown in FIG. 5, four pairs of the first and second electrical conductors 31B and 32B are concentrically arranged around a center directly above the main body 11 and spaced apart at predetermined intervals in plan view. The four pairs of the first and second electrical conductors 31B and 32B are spaced apart at substantially equal intervals and disposed at lower and upper positions from near the rotors 13 to near the position at which the six extensions 22B are connected together.

In the unmanned aerial vehicle 1B of the second embodiment, the propeller guard 20B is dome-shaped, and the plural pairs of the first and second electrical conductors 31B and 32B are disposed to cover the upper half of the unmanned aerial vehicle 1B. These features make it possible to prevent birds and animals from coming into contact with the main body 11 or the rotors 13 not only from side but also from above and to form a wide area for electrically shocking birds and animals in the upper section of the unmanned aerial vehicle 1.

As is obvious from the above description, each embodiment of the present invention has features that bring about advantageous effects as described below.

An embodiment of the present invention is directed to an unmanned aerial vehicle (1, 1A, 1B) including: a main body (11); an arm or arms (12) that extend from the main body (11) to support a rotor or rotors (13); a first electrical conductor or conductors (31, 31A, 31B) which are supported by the arm or arms (12) and to which a voltage is applied; a second electrical conductor or conductors (32, 32A, 32B) which are supported by the arm or arms (12) and spaced apart from the first electrical conductor or conductors (31, 31A, 31B) and to which a voltage lower than the voltage applied to the first electrical conductor or conductors (31, 31A, 31B) is applied; and a controller 100 configured to control electrical supply to the first electrical conductor or conductors (31, 31A, 31B) and the second electrical conductor or conductors (32, 32A, 32B). According to the embodiment, both the first electrical conductor (31, 31A, 31B) and the second electrical conductor (32, 32A, 32B) can come into contact with a monitored target such as a bird or animal to electrically shock the target. The electrically shocked bird or animal can learn the shock to keep away from the flight area of the unmanned aerial vehicle 1. The electric shock is directly applied, which is effective in driving away a wide variety of birds and animals. In addition, electric discharge sounds can be produced for scaring.

In the unmanned aerial vehicle (1, 1B) according to an embodiment of the present invention, the first electrical conductor or conductors (31, 31B) and the second electrical conductor or conductors (32, 32B) are each provided in an annular shape surrounding an area outside the rotor or rotors (13) around the main body (11). According to the embodiment, the first electrical conductor (31, 31B) and the second electrical conductor (32, 32B) surrounding the outer area can provide a large contact area to reliably come into contact at the same time with a monitored target such as a bird or animal even when it tries to evade the unmanned aerial vehicle 1. In addition, the first electrical conductor (31, 31B) and the second electrical conductor (32, 32B) can also function as a propeller guard 20 to guard the rotors (13) from contact with a bird or animal.

In the unmanned aerial vehicle (1A) according to an embodiment of the present invention, the first electrical conductor or conductors (31A) and the second electrical conductor or conductors (31B) are electrodes that protrude in a direction away from the main body (11). According to the embodiment, an electric shock can be given to a bird or animal at a position away from the main body (11) so that the shock given to the main body (11) from a bird or animal coming into contact can be kept small.

The unmanned aerial vehicle (1, 1A, 1B) according to an embodiment of the present invention further includes a camera (50) that detects a target to be monitored, in which when the camera (50) detects the target, the controller (100) shifts to a chase control mode for chasing the target while the controller (100) supplies or is ready to supply a voltage to the first electrical conductor (31, 31A, 31B) and the second electrical conductor (32, 32A, 32B). According to the embodiment, the monitored target such as a bird or animal can be automatically chased, in which the first electrical conductor (31, 31A, 31B) and the second electrical conductor (32, 32A, 32B) can automatically switch to a mode ready to give an electric shock to the bird or animal, with no need to manipulate or instruct the unmanned aerial vehicle (1, 1A, 1B). This allows the unmanned aerial vehicle 1 to autonomously drive away the bird or animal.

In the unmanned aerial vehicle (1, 1A, 1B) according to an embodiment of the present invention, when a camera (50) detects a person, the controller (100) switches from a chase control mode to a no current flow control mode in which no voltage is applied to the first electrical conductor (31, 31A, 31B) and the second electrical conductor (32, 32A, 32B). According to the embodiment, upon detection of a person, the chase control mode, in which a current is allowed to flow through the first electrical conductor (31, 31A, 31B) and the second electrical conductor (32, 32A, 32B), switches to the no current flow control mode, which reliably reduces the risk of an electric shock to the person during automatic chasing of a bird or animal.

The unmanned aerial vehicle (1, 1A, 1B) according to an embodiment of the present invention further includes a camera (50) that detects a person, in which when the camera (50) detects a person, the controller (100) switches to a no current flow control mode in which no voltage is applied to the first electrical conductor (31, 31A, 31B) and the second electrical conductor (32, 32A, 32B). According to the embodiment, upon detection of a person, the chase control mode, in which a current is allowed to flow through the first electrical conductor (31, 31A, 31B) and the second electrical conductor (32, 32A, 32B), switches to the no current flow control mode, which allows safer operation of the unmanned aerial vehicle 1.

The unmanned aerial vehicle according to an embodiment of the present invention further includes a communication device (60) configured to receive external information for starting electrical supply, in which when receiving information for starting electrical supply from the communication device (60), the controller (100) performs control to apply voltages to the first electrical conductor (31, 31A, 31B) and the second electrical conductor (32, 32A, 32B). According to the embodiment, electrical supply can be started at a suitable time based on the external information, so that a monitored target such as a bird or animal can be efficiently driven away with a reduced power consumption for electrical supply to the first and second electrical conductors.

While embodiments of the present invention have been described above, the embodiments described above are not intended to limit the present invention and may be altered or modified within the spirit and scope of the present invention.

The unmanned aerial vehicles 1, 1A, and 1B of the above embodiments have different types of first electrical conductors 31, 31A, and 31B and different types of second electrical conductors 32, 32A, and 32B. Such different types may be combined. For example, the unmanned aerial vehicle 1 or 1B according to the first or third embodiment may further include the electrode holder 80 and the first and second electrical conductors 31A and 32A according to the second embodiment. Alternatively, the unmanned aerial vehicle 1A according to the second embodiment may further include the first and second electrical conductors 31 and 32 according to the first embodiment. Alternatively, the unmanned aerial vehicle 1A according to the second embodiment may further include the extensions 22B and the first and second electrical conductors 31B and 32B according to the third embodiment.

EXPLANATION OF REFERENCE NUMERALS 1, 1A, 1B: unmanned aerial vehicle, 11: main body, 12: arm (support), 13: rotor, 31, 31A, 31B: first electrical conductor, 32, 32A, 32B: second electrical conductor, 100: controller (control unit).

The invention claimed is:

1. An unmanned aerial vehicle comprising:
   a main body;
   a support that extends from the main body to support a rotor;
   a first electrical conductor which is supported by the support and to which a voltage is applied;
   a second electrical conductor which is supported by the support and spaced apart from the first electrical conductor and to which a voltage lower than the voltage applied to the first electrical conductor is applied;
   a detector; and
   a controller comprising a memory including program instructions that when executed by at least one processor, cause at least one of the at least one processor to:
   control electrical supply to the first and second electrical conductors;
   compare an image captured by the detector to information stored in the memory;
   determine, based on the comparison, whether the image includes a target to be monitored; and
   enter, based on the controller determining that the image includes the target to be monitored, the controller into a chase control mode.

2. The unmanned aerial vehicle according to claim 1, wherein the first and second electrical conductors are each provided in an annular shape surrounding an area outside the rotor around the main body.

3. The unmanned aerial vehicle according to claim 1, wherein the first and second electrical conductors are electrodes that protrude in a direction away from the main body.

4. The unmanned aerial vehicle according to claim 1, wherein
while the controller is in the chase control mode, the controller supplies or is ready to supply a voltage to the first and second electrical conductors.

5. The unmanned aerial vehicle according to claim 4, wherein the controller determines, based on the comparison, whether the image includes a person; and based on the controller determining that image includes a person, the controller switches from the chase control mode to a no current flow control mode in which no voltage is applied to the first and second electrical conductors.

6. The unmanned aerial vehicle according to claim 1, wherein
the controller determines, based on the comparison, whether the image includes a person; and
based on the controller determining that the image includes a person, the controller switches to a no current flow control mode in which no voltage is applied to the first and second electrical conductors.

7. The unmanned aerial vehicle according to claim 1, further comprising a communication section configured to receive external information for starting electrical supply, wherein
when receiving information for starting electrical supply from the communication section, the controller performs control to apply voltages to the first and second electrical conductors.

8. The unmanned aerial vehicle according to claim 1, wherein while the controller is in the chase control mode, the controller controls the flight of the unmanned aerial vehicle such that the distance between the unmanned aerial vehicle and the target to be monitored is shorter than a predetermined value.

9. The unmanned aerial vehicle according to claim 1, wherein while the controller is in the chase control mode, the controller causes the first and second electrical conductors to produce an electric discharge sound.

10. An unmanned aerial vehicle comprising:
a main body;
a support that extends from the main body to support a rotor; and
a propeller guard that is dome-shaped as a whole and attached to the support,
the propeller guard comprising:
a first electrical conductor to which a voltage is applied;
a second electrical conductor to which a voltage lower than the voltage applied to the first electrical conductor is applied;
a detector; and
a controller comprising a memory including program instructions that when executed by at least one processor, cause at least one of the at least one processor to:
compare an image captured by the detector to information stored in the memory;
determine, based on the comparison, whether the image includes a target to be monitored; and
enter, based on the controller determining that the image includes the target to be monitored, the controller into a chase control mode, wherein while the controller is in the chase control mode, the controller controls the flight of the unmanned aerial vehicle such that the distance between the unmanned aerial vehicle and the target to be monitored is shorter than a predetermined value.

11. The unmanned aerial vehicle according to claim 10, wherein the first and second electrical conductors are spaced apart from each other and arranged to extend substantially in parallel to each other.

12. The unmanned aerial vehicle according to claim 10, wherein the first and second electrical conductors are each provided in an annular shape surrounding an area outside the rotor around the main body as a center.

13. The unmanned aerial vehicle according to claim 10, wherein the program code is further configured to cause at least one of the at least one processor to control electrical supply to the first and second electrical conductors.

14. The unmanned aerial vehicle according to claim 13, wherein
while the controller is in a chase control mode, the controller supplies or is ready to supply a voltage to the first and second electrical conductors.

15. The unmanned aerial vehicle according to claim 13, wherein the controller determines, based on the comparison, whether the image includes a person; and based on the controller determining that the image includes a person,
the controller switches to a no current flow control mode in which no voltage is applied to the first and second electrical conductors.

16. The unmanned aerial vehicle according to claim 13, further comprising a communication section configured to receive external information for starting electrical supply, wherein
when receiving information for starting electrical supply from the communication section, the controller performs control to apply voltages to the first and second electrical conductors.

17. The unmanned aerial vehicle according to claim 13, wherein
when receiving, from a ground system for detecting a target to be monitored, a signal indicating the detection of the target, the controller enters a chase control mode for chasing the target while the controller supplies or is ready to supply a voltage to the first and second electrical conductors.

18. The unmanned aerial vehicle according to claim 10, wherein while the controller is in the chase control mode, the controller controls the flight of the unmanned aerial vehicle such that the distance between the unmanned aerial vehicle and the target to be monitored is shorter than a predetermined value.

19. The unmanned aerial vehicle according to claim 10, wherein while the controller is in the chase control mode, the controller causes the first and second electrical conductors to produce an electric discharge sound.

* * * * *